Patented Aug. 21, 1951

2,565,175

UNITED STATES PATENT OFFICE 2,565,175

MANUFACTURE OF WOOD PRESERVATIVES

Bror Olof Häger, Stockholm, Sweden

No Drawing. Application June 6, 1947, Serial No. 753,039. In Sweden June 22, 1946

5 Claims. (Cl. 167—38.5)

My present invention relates to a method of making preservatives for wood and other organic materials to prevent attacks of wood destroying fungi, termites and other insects, marine borers, etc., and more specifically, to a method for manufacturing preservatives giving no soluble products in the material after treatment.

Preservatives according to the invention contain five valent arsenic compound and six valent chromium compound of one or more metals, which with arsenic acid can form difficultly soluble arsenate. The arsenic compound can be arsenic acid (arsenic pentoxide) or acid arsenate of one or more metals which with arsenic acid can form difficultly soluble arsenate or a mixture of the latter with arsenic acid. The most suitable metals are zinc, copper and aluminium but also magnesium, cadmium, manganese, iron, mercury, chromium and nickel may be used. As an example of the composition the preservative can be said to contain arsenic acid and six valent chromium compounds with zinc. The intention is to use the preservative in water solution. After being introduced into the material it forms difficulty soluble compounds, which protect against wood destroying organisms.

Regarding the composition of the preservative the following can generally be said. The total amount of positive metal ion in the preservative, i. e. the amount in the chromium compound plus the amount which the arsenic compound eventually contains, usually ought to be as high as possible, but naturally not higher than a sufficient amount of chromium compound can be dissolved for obtaining an adequate fixation. The acidity of the preservative must further be so high that the preservative can be dissolved in water and form stable solutions. When the arsenic compound is an acid arsenate the amount of metal in the chromium compound has to be limited in order to make the preservative enough water soluble. In order to simplify the following description the whole amount of positive metal ion is considered to be contained in the chromium compound.

In order to obtain satisfactory fixation (precipitation) of the arsenic acid a certain smallest amount of the chromium compound may be used, usually at least so much that triarsenate of metal and chromium can be formed, as they have been found to be very resistant to leaching and for that reason to be preferred to diarsenate. In order to give an example of the idea it may be mentioned that if the preservative is supposed to contain arsenic acid and zinc chromate per mol arsenic pentoxide at least 1.2 mols of chromate may be present according to the supposed formula for the reaction in the material:

$1.2ZnCrO_4 + As_2O_5 \rightarrow$
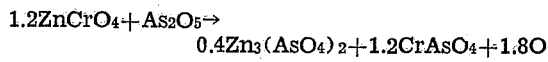
$0.4Zn_3(AsO_4)_2 + 1.2CrAsO_4 + 1.8O$ The most suitable composition of the preservative variate with the positive metal used. Of special interest are the metals zinc and copper, which in this respect are similar. Relating to the composition of the chromium compound the following may be said. The relative amount of zinc, copper or zinc and copper in the chromium compound ought not to reach more than one atom metal per atom chromium. Otherwise difficultly soluble metal arsenates may be formed when the preservative is manufactured or when it is dissolved in water. If a solution of the preservative is to be evaporated to dryness when heating is used, the relative amount of metal may be limited to no more than 0.8–0.9 atom metal per atom chromium. The reason why such preciptations can be formed depends thereon that zinc and copper arsenate are less soluble per unit of weight of arsenic acid in concentrated solutions of arsenic acid than in diluted solutions and the risk for precipitations is greater in heat. If the preciptations have merely been formed, they will be dissolved slowly.

On the other hand as already said above the relative amount of zinc, copper or zinc and copper ought not to be less than necessary as these metals have a good protective effect of their own against wood destroyers. When dichromate of these metals are easily soluble, the relative amount of metal ought not to be less than half an atom metal per atom chromium. Thus the composition of the chromium compound has to correspond to the abstract formula $$(MeO)_{0.5-1.0} \cdot CrO_3$$
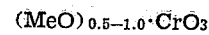

where Me is the sign for one atom of zinc or copper.

Regarding the amount of chromium compound in relation to the arsenic acid the following may be said. When the effect of the preservative will mainly be based on the arsenic compound, it has at first hand been suitable to—per mol arsenic pentoxide—use 1–3 mols of the chromium compound. One mol chromium compound means here the amount of the compound, which contains one atom chromium. Per mol $As_2O_5$ the preservative thus contains between 1 and 3 mols of $(MeO)_{0.5-1.0} \cdot CrO_3$. When the relative amount of metal is high within the given limits, a smaller amount of the chromium compound has to be used. If consideration is taken to different factors it has been observed to be most suitable to use a preservative which per mol $As_2O_5$ contains 1.5–2 mols of chromium compounds with a composition mainly according to the formula $(MeO)_{0.7} \cdot CrO_3$. When using this composition all compounds in the preservative will after treatment be very well fixed in the material.

Another important metal is aluminium. The different components of the preservative is here used in other proportions. When the aluminium arsenate can be dissolved very good per unit of weight of arsenic acid also in concentrated solutions of arsenic acid, the molecular amount of aluminium can be high in the chromium compound. It is suitable to have between 0.5 and 1.5 atoms aluminium per atom chromium. The most suitable amount may be between 0.9 and 1.2 atoms aluminium per atom chromium. The aluminium-chromium compound ought to correspond to the arsenic acid in such a way that to every mol $As_2O_5$ corresponds 1.5–3 atoms aluminium or chromium. The most suitable proportions seem to be that for every mol $As_2O_5$ to use 2.5–3 atoms aluminium or chromium. In which proportions the arsenic acid is fixed by aluminium or chromium is mainly depending on the composition of the chromium compound. The aluminium-chromium compound fixes the arsenic acid very good, but has no higher effect of its own against wood destroyers.

The proportions when using cadmium-chromium compounds, which have a good effect of its own, will be about the same as when using zinc or copper. Calcium and magnesium can be used in a relatively bigger amount in the preservatives. They have a smaller fixing effect and little effect of their own against wood destroyers.

Sometimes it can be suitable to increase the amount of the chromium compound in relation to the arsenic compound to a greater extent than what has been said above. In this way it is possible to get preservatives with different properties. This is of more positive interest only when one or several of the positive metal ions have a more distinct effect against the destroying organisms. In these cases it is hard to give a clear limit for the relative amount chromium salt in relation to the arsenic compound. For practical purposes there seems to be no reason to—per mol arsenic pentoxide—use more than 6 mols of the chromium compound. When these high amounts of chromium compounds are used, the metal amount in the chromium compound must usually be relatively small, otherwise the preservative will not be soluble enough.

Also if it can not be considered quite perfect to use more metal in the chromium compound or less chromium compound in relation to the arsenic compound than described here, this naturally can be used in cases, when it is less important to have the preservative well fixed. A smaller amount of the chromium than what corresponds to half the amount, which is needed for forming triarsenate, ought not to be used even if these circumstances are prevailing.

The preservative is intended to be used in a water solution, which is introduced in the material according to well-known methods for treating wood with preservatives. When the protective effect mainly will be based on the arsenic compound and give protection under the circumstances, which usually are prevailing outdoors the concentration of the solution by full cell treatment ought to be between 0.5 and 1 per cent figured as arsenic pentoxide. For the treatment of wood to be used in water for protection for example against attacks from marine borers the concentration ought to be increased to about the double, whereby the material gets a corresponding amount more preservative. An increase of the concentration of the solution may also be advisable, when a higher margin of security against destruction is wanted, as when giving protection to more expensive constructions. The higher cost for the preservative means in such cases very little. In order to reach a higher protective effect a repeated treatment with seasoning between can naturally be also made, but this will usually be more expensive than to use a higher concentration of the solution.

Preservatives according to the invention are cheap and effective in use. After the solution has been introduced into the material, the chromium compound is reduced by some substances, easy to oxidize, and as a result of this the preservative substances are precipitated and fixed. These substances may be considered to be arsenates or basic arsenates, which are very difficultly soluble and resistant. They will not be leached out or converted by air or moisture and at the same time they have a very high effect against the destroying organisms. All substances (radicals), which constitute the preservative, remain in the final product and this one is well balanced with respect to its suitability as a protective agent. Any soluble products will not be formed.

The described preservatives naturally can also be used together with other preservatives in order to reach effects in different respects, among others protection against mould and blue stain. The invention can also be modified thus that the chromium compound is used as a fixing agent for other preservatives, which together with the positive ion of the chromium salt or with the reduced chromium form difficultly soluble salts, for example fluorides, or such preservatives which can be precipitated by the decreased acidity when the chromium salt is reduced. Such preservatives are for example copper salts.

As said above the invention further includes methods for the manufacturing of preservatives, which do not form water soluble products in the material after treatment beside the protective compounds, in any case not in any amount of importance. This fact is of great importance, as soluble products decrease the resistance of the protective compounds to leaching at the same time as they give the material less desirable electric properties and a higher corrosion effect on metal objects. Soluble products also can cause cattle in need of salt to lick the wood with subsequent risk for poisoning and further they can form salt crusts on the surface of the wood, which will disturb the appearance and make painting difficulties.

Preservatives of this kind are according to the invention made of substances of such a choice, that the ones of the radicals of the substances (ions, atom groups), which will not be contained in the difficultly soluble and protective compounds formed in the material after the treatment, with each other can form a difficultly soluble product. Radicals fit for this purpose are calcium, sulfate, carbonate, or admixture of sulfate and carbonate, and when the preservative is manufactured precipitations of calcium sulfate, calcium carbonate or a mixture of calcium sulfate and calcium carbonate will be formed. The calcium compounds can then be separated, as the radicals, which will be contained in the protective compounds, form a sufficient acid system for its own dissolution. This separation will be done easiest in connection with the manufacturing of the preservatives. In order to obtain a good result of the precipitation relatively concentrated solutions ought to be used. Furthermore washwater may be used from former precipitation for the conversion. It ought to be arranged so that the amounts of the positive and negative radicals of the calcium compound correspond to each other, eventually done by extra additions of suitable amounts of some of these radicals. The amount of the positive radical present in the calcium compound ought thus at least to correspond to the amount of the negative radical. If a less amount of difficultly soluble calcium compound remains in the solution (the preservative) this has no deterring effect.

The method of manufacturing is specially suitable for making preservatives containing chromium and arsenic compounds of the type described above. When making preservatives, which after treatment precipitate arsenates of chromium, zinc, copper, aluminium arsenates of two or more of the metals just mentioned, etc. in the material usually arsenic acid or alkali arsenate, alkali dichromate and a metal salt for example copper or zinc sulfate have been used. When such a preservative is converted in the material soluble alkali salt, for example sodium sulfate, is formed corresponding to the negative ion in the metal salt besides the difficultly soluble chromium and copper or zinc arsenates.

According to the invention the preservative for example can be manufactured of arsenic acid, calcium dichromate, calcium chromate or mixture of calcium dichromate and calcium chromate and sulfate of the metal, which furthermore will be present in the preservative. Herewith calcium sulfate is formed, which easily can be separated before the preservative is used. The solution obtained can after dilution be used directly for treatment. It can be transported in suitable vessels for example tank cars. The solution can also be evaporated to a solid salt, which later on is used for making the preservative solution. The following formula may be given as an example on the reaction by the manufacturing:

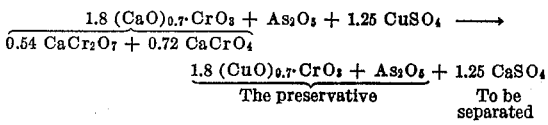

$$1.8\,(CaO)_{0.7}\cdot CrO_3 + As_2O_5 + 1.25\,CuSO_4 \longrightarrow$$
$$0.54\,CaCr_2O_7 + 0.72\,CaCrO_4$$
$$\underbrace{1.8\,(CuO)_{0.7}\cdot CrO_3 + As_2O_5}_{\text{The preservative}} + \underbrace{1.25\,CaSO_4}_{\text{To be separated}}$$

When the preservatives contain six valent chromium/or five valent arsenic compounds the manufacturing can be done from very cheap raw materials. For the production of the six valent chromium compound it is suitable to use chromium ore, chromium trioxide, chromium iron or chromium waste etc. as raw material. The chrome raw material is mixed with calcium oxide, calcium carbonate or an admixture of calcium oxide and calcium carbonate and heated in presence of air, whereby calcium chromate is obtained. In practice the chrome material is usually mixed with calcium oxide or carbonate and alkali carbonate. The chromium material is herewith partly transferred to alkali chromate, which then has to be converted with suitable calcium compound. The five valent arsenic compound is produced by oxidation of arsenic trioxide. The oxidation can suitably be carried out with nitric acid or by heating with calcium nitrate. When impurities in arsenic trioxide are usually composed of sulfuric acid, crude arsenic generally can be used. The sulfuric acid will later on be separated from the preservative as calcium sulate. If the chromium material does not contain unsuitable ingredients as iron etc., it may be possible to oxidize the chromium material and arsenic trioxide together by heating them in presence of alkaline substances.

When producing chromate and arsenate according to the methods described so much calcium is usually needed, that calcium can not be quite precipitated with the metal sulfate which is later added when preparing the preservative. In such cases the surplus of calcium can be precipitated with a corresponding amount of sulfuric acid and/or carbon dioxide. Carbon dioxide can naturally not be used in too acid solutions but can for example be used for precipitation of calcium from calcium chromate.

The nitrogen containing gases from the oxidation of the arsenic trioxide can be mixed with air for being oxidized and thereafter absorbed in water, in which calcium oxide or calcium carbonate eventually is washed. In this way nitric acid or calcium nitrate is regenerated and can be used for the oxidation of a new amount of the arsenic trioxide.

The methods of producing the preservative can in their details be variated in many different ways. As an example it may be said that a metal arsenate can be dissolved in sulfuric acid, whereafter the calcium chromium compound is added. The arsenic compound, for example arsenic acid, need not be added at one time or from beginning but can be added at different moments. The principle for the manufacturing may simplest be described so, that the preservative is produced by bringing together the radicals calcium, six valent chromium, five valent arsenic, sulfate (sulfuric acid), carbonate (carbon dioxide) or admixture of sulfate and carbonate and one or more metals, which with arsenic acid can form difficultly soluble arsenate. The different radicals can be brought together in different ways and in different order and at different moments. After the difficultly soluble calcium salt has been formed it is filtered away.

The invention is not limited to the use of difficultly soluble calcium compounds when producing preservatives. Also other difficultly soluble compounds can be used in similar ways, for example strontium and barium compounds. Nor is it limited to the production of preservatives according to the given examples. The invention can also be used for making other preservatives for example preservatives, which contain other active ingredients as fluoride compounds or organic compounds.

I claim:

1. Method of producing a preservative for the treatment of wood and other organic materials subject to attack by wood-destroying fungi, termites, other insects and marine borers, which comprises bringing together in an aqueous system a hexavalent chromium compound of at least one metal of the group consisting of calcium, strontium and barium, a pentavalent arsenic compound and at least one compound of the group of salts consisting of sulphates and carbonates of a metal selected from the group consisting of zinc, copper, aluminum, magnesium, cadmium, manganese, iron, mercury, chromium and nickel, adding the compounds in such proportions as to hold the resulting difficultly soluble arsenates of the last mentioned metals in solution but to precipitate the resulting more difficultly soluble salts of the group consisting of sulphate and carbonate of the metals of the group consisting of calcium, barium and strontium, and removing said precipitate.

2. The method defined in claim 1, in which the pentavalent arsenic compound is arsenic acid.

3. Method of producing a preservative for the treatment of wood and other organic materials subject to attack by wood-destroying fungi, termites, other insects and marine borers, which comprises bringing together in an aqueous system a hexavalent chromium compound of calcium, a pentavalent arsenic compound and a sulphate of a metal selected from the group consisting of zinc, copper, aluminum, magnesium, cadmium, manganese, iron, mercury, chromium and nickel, adding the compounds in such proportions as to hold the resulting difficultly soluble arsenates of the last mentioned metals in solution, but to precipitate the resulting more difficultly soluble sulphate of calcium, and removing said precipitate.

4. Method of producing a preservative for the treatment of wood and other organic materials subject to attack by wood-destroying fungi, termites, other insects and marine borers, which comprises bringing together in an aqueous system a hexavalent chromium compound of calcium, a pentavalent arsenic compound and a carbonate of a metal selected from the group consisting of zinc, copper, aluminum, magnesium, cadmium, manganese, iron, mercury, chromium and nickel, adding the compounds in such proportions as to hold the resulting difficultly soluble arsenates of the last mentioned metals in solution, but to precipitate the resulting more difficultly soluble carbonate of calcium, and removing said precipitate.

5. Method of producing a preservative for the treatment of wood and other organic materials subject to attack by wood-destroying fungi, termites, other insects and marine borers, which comprises bringing together in an aqueous system a hexavalent chromium compound of calcium selected from the group consisting of calcium chromate and calcium dichromate, arsenic acid and a sulphate of a metal which forms a difficultly soluble metal arsenate, said metal being selected from the group consisting of zinc, copper, aluminum, magnesium, cadmium, manganese, iron, mercury, chromium and nickel, maintaining the system sufficiently acidic to keep the resulting difficultly soluble metal arsenate in solution, and removing the resulting precipitate of calcium sulphate from the resulting acidic preservative solution.

BROR OLOF HÄGER.

REFERENCES CITED

The following references are of record in the file of this patent:

UNITED STATES PATENTS

| Number | Name | Date |
| --- | --- | --- |
| 2,106,978 | Kamesam | Feb. 1, 1938 |
| 2,325,359 | Arnold | July 27, 1943 |
| 2,432,007 | Hager | Dec. 2, 1947 |
| 2,438,511 | McMahon | Mar. 30, 1948 |

FOREIGN PATENTS

| Number | Country | Date |
| --- | --- | --- |
| 516,406 | Great Britain | Jan. 1, 1940 |